United States Patent
Arthur et al.

(10) Patent No.: US 7,859,498 B2
(45) Date of Patent: Dec. 28, 2010

(54) DISPLAY DEVICE HAVING MULTIPLEXING RESISTORS WITHIN RESIN LAYER

(75) Inventors: Alan R. Arthur, Salem, OR (US); Zhuqing Zhang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 11/740,649

(22) Filed: Apr. 26, 2007

(65) Prior Publication Data

US 2008/0266242 A1  Oct. 30, 2008

(51) Int. Cl.
 *G09G 3/36* (2006.01)
(52) U.S. Cl. .............................. 345/87; 345/90; 345/98
(58) Field of Classification Search ........... 345/87–103, 345/204–215, 690
See application file for complete search history.

(56) References Cited

U.S. PATENT DOCUMENTS

| 6,850,212 | B1 | 2/2005 | Aitken et al. |
| 7,327,335 | B2 * | 2/2008 | Yamazaki et al. ............. 345/76 |
| 2004/0201545 | A1 * | 10/2004 | Yamazaki et al. ............ 345/1.1 |
| 2006/0082710 | A1 | 4/2006 | Kitson et al. |

* cited by examiner

*Primary Examiner*—Vijay Shankar

(57) ABSTRACT

A display element for a display device includes a display mechanism and a resin layer. One or more busbars and one or more multiplexing resistors are disposed within the resin layer. The multiplexing resistors are communicatively connected to one or more address lines to permit the display element to be addressed by selective assertion of the address lines in a multiplexing manner.

20 Claims, 8 Drawing Sheets

DISPLAY DEVICE HAVING MULTIPLEXING RESISTORS WITHIN RESIN LAYER

BACKGROUND

Digital display devices typically include a number of digital display elements, such as liquid crystal display (LCD) elements and other types of display elements. The display elements can correspond to the pixels or sub-pixels of the display device in question, so that the display device has a desired resolution, such as 1920×1080 (i.e., 1080p), 1920× 540 (i.e., 1080i), 1280×720 (i.e., 720p), or another resolution. Thus, a display device having a resolution of 1080p may have 1920×1080, or 2,073,600, display elements.

A display device may address its display elements so that it can individually cause a given display element to display a desired brightness and/or a desired color. Addressing a large number of display elements, however, can result in an inordinate number of address lines to be added to the display device. Existing solutions to this issue include multiplexing the display elements to reduce the number of address lines. However, conventional multiplexing can be difficult and/or costly to implement within display devices having display elements.

DETAILED DESCRIPTION OF THE DRAWINGS

Figure 1:
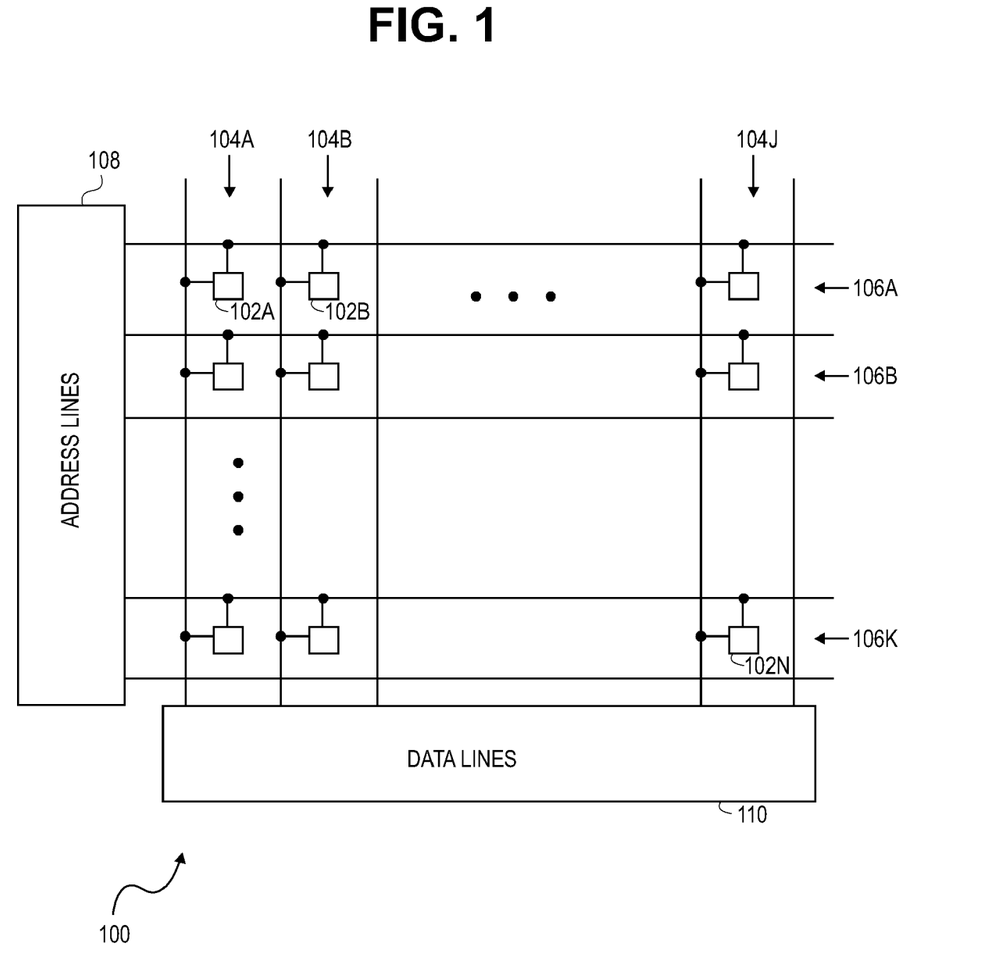
FIG. 1 is a diagram of a display device having a number of addressable display elements, according to an embodiment of the invention.

FIG. 1 shows a representative display device 100, according to an embodiment of the invention. The display device 100 may be a digital display device. The display device 100 includes a number of display elements 102A, 102B, ..., 102N, collectively referred to as the display elements 102. Those of ordinary skill within the art can appreciate that the display device 100 can and typically does include other components, in addition to those depicted in FIG. 1, such as driving circuitry, and so on. The display elements 102 may be digital display elements, such as liquid crystal display (LCD) elements. The display elements 102 may correspond to pixels or sub-pixels of the display device 100. For example, in one embodiment, where the display device 100 has a given resolution of j by k, there may be j times k of the display elements 102.

The display elements 102 are organized in the embodiment of FIG. 1 over a number of columns 104A, 104B, ..., 104J, collectively referred to as the columns 104, and a number of rows 106A, 106B, ..., 106K, collectively referred to as the rows 106. As depicted in FIG. 1, the display elements 102 are communicatively and/or conductively connected to address lines 108 of the display device 100, which may also be referred to as row or select lines, and data lines 110 of the display device 100, which may also be referred to as column lines. By appropriately asserting or selecting one or more of the address lines 108 and one or more of the data lines 110, each of the display elements 102 can be individually addressed, or selected. One approach by which the display elements 102 can be individually selected in a multiplexing and/or scanning manner is described later in the detailed description.

Figure 2:
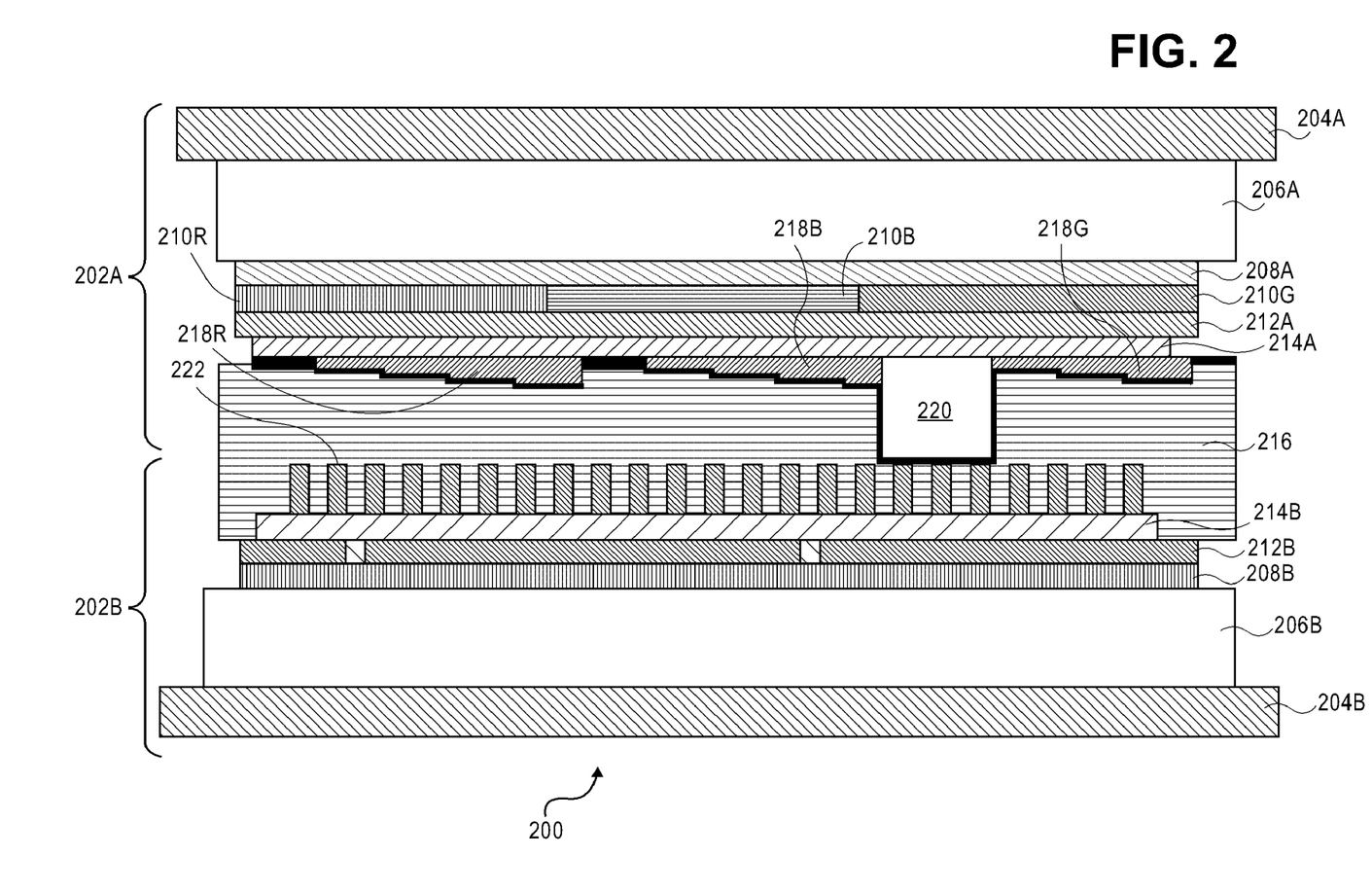
FIG. 2 is a diagram of a display element that may be used as part of a display device, according to an embodiment of the invention.

FIG. 2 shows a representative display element 200, according to an embodiment of the invention. Each of the display elements 102 of the display device 100 may be implemented as an instance of the display element 200. The display element 200 may be a digital display element. In one embodiment, the display element 200 is that which is more particularly described in the pending US patent application entitled "Display device with grayscale capability," filed on Sep. 23, 2005, and published as US patent publication number 2006/0082710 on Apr. 20, 2006. Additionally, the display element 200 may be an LCD element, or another type of display element, as can be appreciated by those of ordinary skill within the art.

The display element 200 includes a first side 202A and a second side 202B, collectively referred to as the sides 202. The side 202A includes a polarizing layer 204A, whereas the side 202B includes a polarizing layer 204B. The polarizing layers 204 polarize light. The polarizing layers 204 may each be 125 microns in thickness. The side 202A further includes a substrate 206A under the polarizing layer 204A, whereas the side 202B further includes a substrate 206B over the polarizing layer 204B. The substrates 206 may be a polymeric material, such as that which is known by the trade name AryLite™, available from Ferrania S.p.A., of Cairo Montenotte, Italy. The side 202A may include the address lines by which the display element 200 is addressed, and the side 202B may include the data lines by which the display element 200 is addressed, as is described in more detail later in the detailed description.

The sides 202 of the display element 200 include a display mechanism 216 divided between the sides 202. The display mechanism 216 may be a liquid crystal, or another type of display mechanism. The display mechanism 216 includes one or more gradation layers 218R, 218B, and 218G, corresponding to red, blue, and green, respectively, and collectively referred to as the gradation layers 218. The gradation layers 218 may be fabricated from an optically transparent, ultraviolet or otherwise patternable or embossable polymer, or another type of material.

The gradation layer 218 permit the display mechanism 216 of the display element 200 to display different brightnesses of the colors red, blue, and green. In particular, different voltages above the turn-on voltage of the display mechanism 216, asserted between the portions of the display mechanism 216 aligning with the gradation layers 218R, 218B, and 218G, result in different brightnesses of the corresponding colors red, blue, and green. In general, the greater the voltage asserted, the more bright the resulting color of light realized by the corresponding portion of the display mechanism 216.

The display mechanism 216 may be a post aligned bistable nematic (PABN) liquid crystal layer in one embodiment of the invention. In such an embodiment, the display element 200 is bi-stable, in that once it has been turned on by applying a first voltage over the display mechanism 216, the display element 200 remains in its current state, until it is turned off.

That is, voltages do not have to be continually applied over the display mechanism 216 for the display element 200 to remain in its current state, once the element 200 has been switched to that state. Stated another way and most generally, in this embodiment, the display element 200 remains in its current state until voltage is applied over the display mechanism 216 to change the state of the display element 200.

The display mechanism 216 further includes a number of microstructure pillars 222, which serve to provide the bistability of the display element 200, and which may be fabricated from an optically transparent, ultraviolet or otherwise patternable or embossable polymer, or another type of material. The display mechanism 216 also includes a spacer 220, which may be two microns in height. The spacer 220 serves to separate the top part of the display mechanism 216 from the microstructure pillars 222 and maintain a constant gap distance between sides 202A and 202B.

The side 202A includes a conductive layer 214A above the display mechanism 216, and the side 202B includes a conductive layer 214B below the display mechanism 216. The conductive layers 214 permit the address and data lines within the substrates 206 to impart a voltage over the display mechanism 216. The conductive layers 214 may be fabricated from a complex of polyethylenedioxythiophene (PEDOT) and polystyrene sulfonic acid (PSS), or another type of conductive material. The conductive layers 214 may be considered to be part of the display mechanism 216 in one embodiment.

The side 202A includes a resin layer 212A above the conductive layer 214A, and thus above the display mechanism 216, and the side 202B includes a resin layer 212B below the conductive layer 214B, and thus below the display mechanism 216. The resin layer 212A may be fabricated from an optically transparent, ultraviolet or otherwise patternable or embossable polymer, or another type of resin. The resin layers 212 include busbars that conductively or communicatively connect the conductive layers 214 to the address and data lines within the substrate layers 206 in one embodiment, as can be appreciated by those of ordinary skill within the art. Furthermore, the resin layer 212A includes multiplexing resistors that provide for integrated multiplexing functionality of the address lines within the substrate layer 206A, as is described in more detail later in the detailed description.

The side 202A of the display element 200 further includes a red filter 210R, a blue filter 210B, and a green filter 210B, collectively referred to as the color filters 210, and which correspond to the gradation layers 218. Thus, white light incident to the side 202A is filtered by the red filter 210R so that just red light reaches the display mechanism 216 at the gradation layer 218R. Similarly, such white light is filtered by the blue filter 210B so that just blue light reaches the display mechanism 216 at the gradation layer 218B, and is filtered by the green filter 210G so that just green light reaches the display mechanism at the gradation layer 218G. The color filters 210 may be considered to be part of the display mechanism 216 in one embodiment.

The side 202A of the display element 200 includes an adhesive layer 208A to adhere, or bond, the substrate layer 206A to the color filters 210 and thus to the resin layer 212A. Similarly, the side 202B of the display element 200 includes an adhesive layer 208B to adhere, or bond, the substrate layer 206B to the resin layer 212B. The adhesive layer 208A maybe fabricated from the material identified by the trade name Dymax Light Weld 3016, and available from Dymax Corp., of Torrington, Conn., or the adhesive layer 208A may be fabricated from another type of adhesive material. The adhesive layer 208 may also be conductive. The conductive adhesive layer 208B may be fabricated from anisotropic conductive adhesive (ACA), such as that identified by the trade name TAP0604C, and available from Kyocera Chemical Corp., of Kawaguchi, Japan, or the conductive adhesive layer 208B may be fabricated from another type of ACA.

Figure 3:
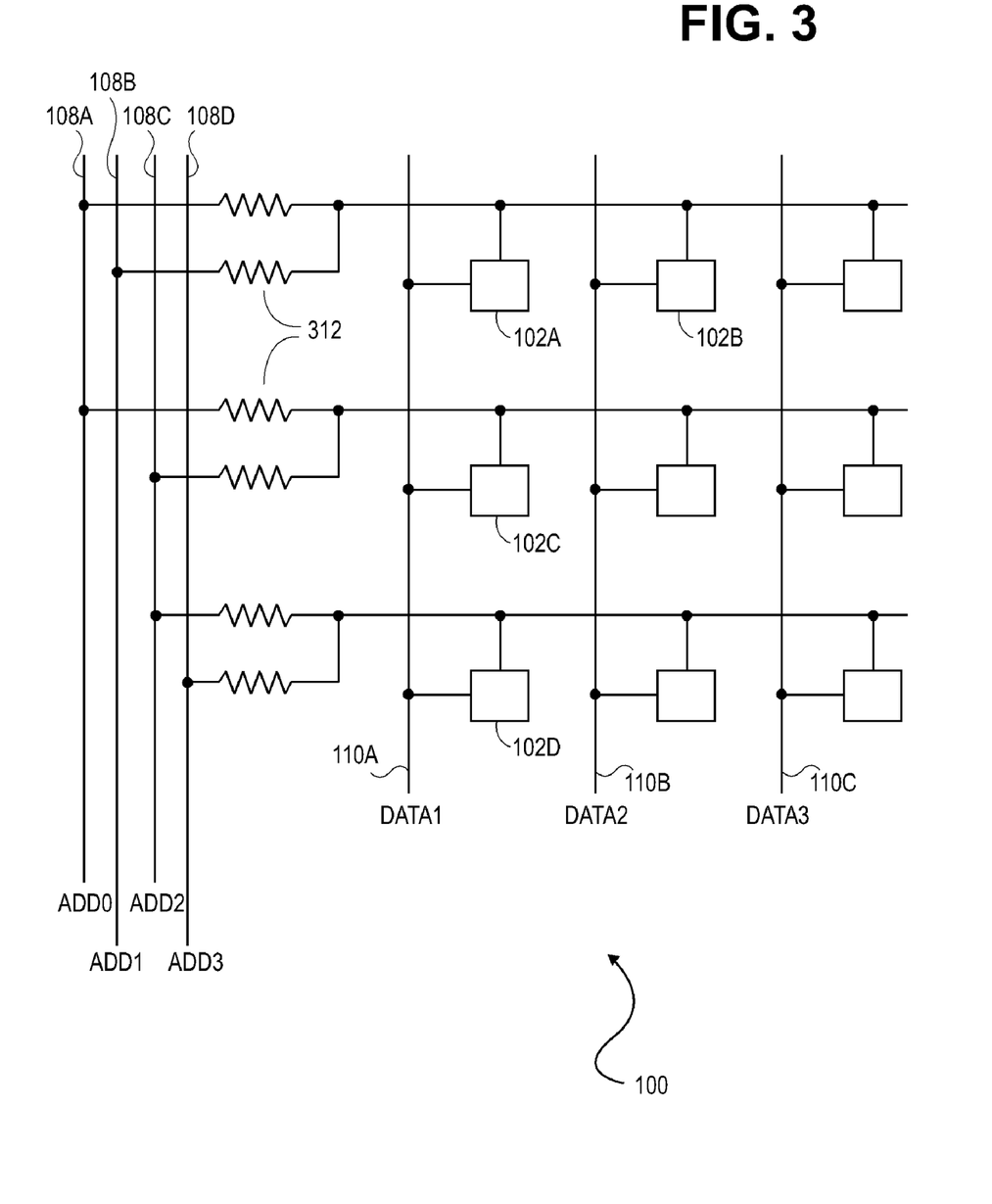
FIG. 3 is a diagram depicting resistive multiplexing of the display elements of a display device, using multiplexing resistors, according to an embodiment of the invention.

FIG. 3 shows how the display elements 102 of the display device 100 can be individually addressed in a resistive multiplexing and scanning manner, according to an embodiment of the invention. A representative portion of the display device 100 is specifically shown in FIG. 3. Four address lines 108A, 108B, 108C, and 108D are particularly depicted, as are three data lines 110A, 110B, and 110C. Besides the display elements 102A and 102B, display elements 102C and 102D are specifically called out in FIG. 3 as well.

The display elements 102 are addressed in a row-by-row, or scanning, manner. Thus, first the display elements in the row including the display elements 102A and 102B are selected, then the display elements in the row including the display element 102C are selected, and finally the display elements in the row including the display element 102D are selected. When the display elements in any given row are to be addressed, the data lines 110A, 110B, and 110C are pulled to voltages based on the values to be written to the corresponding display elements of the given row. Such voltages may be referred to as reference voltages, and may be ground, a low voltage, a high voltage, or a common voltage. The given row in question is addressed by selectively asserting voltages on the address lines 108, as is described in more detail in the next paragraph. As an example, asserting voltages on the address lines 108A and 108B selects the row including the display elements 102A and 102B, whereas, as another example, asserting voltages on the address lines 108A and 108C selects the row including the display element 102C. This process is a scanning addressing process, in that addressing proceeds on a row-by-row basis, across the display device 100, such that the display elements 102 thereof are effectively scanned from top to bottom or from bottom to top.

Each row of the display elements 102 is addressed in a resistive multiplexing manner. Such resistive multiplexing is operable due to the unique combinations of connections of resistors between rows of the display elements 102 and the address lines 108. The row of display elements 102 including the display elements 102A and 102B is conductively or communicatively connected to the address lines 108A and 108B via multiplexing resistors 312. The row of display elements 102 including the display element 102C is connected to the address lines 108A and 108C via multiplexing resistors 312. The row of display elements 102 including the display element 102D is communicatively connected to the address lines 108C and 108D via multiplexing resistors 312. The resistors 312 are multiplexing resistors in that they provide multiplexing functionality regarding the display elements 102 via the address lines 108.

For example, any of the rows of display elements can be individually addressed, as is now described as representative of each of the data lines 110 being pulled to the reference voltage. Assuming all the resistors 312 are of the same resistance value, if a voltage V is asserted on the address lines 108A and 108B, and the address lines 108C and 108D are pulled to ground, then a voltage V is applied on the row that connects to the display elements 102A and 102B, since this row is connected to both the address lines 108A and 108B via multiplexing resistors 312. However, just a voltage V/2 is applied on the row that connects to the display element 102C, since although the display element 102C is connected to the address line 108A via a multiplexing resistor 312, it is also connected to the address line 108C via a multiplexing resistor 312, and the address line 108C is pulled to the ground. Zero voltage is applied on the row that connects to the display element 102D, since the display elements 102D is connected to the address lines 108C and 108D both of which are pulled to ground.

Therefore, when the data line 110A is pulled to ground, the voltage across the display element 102A is V, whereas the voltage across the display element 102C is V/2 and the voltage across the display element 102D is 0. If the turn-on voltage of the display elements 102 at which the display elements 102 begin to display a non-black brightness of one or more colors is greater than V/2, such as greater than 3V/4, just the display element 102A is turned on (i.e., individually selected) in the example of the previous paragraph. In general, to turn on a given display element, and thus to individually address this display element, a voltage V is asserted on all the address lines to which the display element is connected via multiplexing resistors. If a display element is connected to at least one address line (via a multiplexing resistor) on which a voltage V has not been asserted, that display element does not turn on, and thus is not individually addressed.

In this way, the multiplexing resistors 312 serve to multiplex the display elements 102. There can be a lesser number of address lines 108 than there are rows of display elements 102 by using the multiplexing resistors 312 to decrease the voltage over desired non-selected display elements so that they do not turn on. In the example that has been described, for instance, the multiplexing resistor 312 connecting the display element 102C to the address line 108C decrease the voltage over the element 102C to V/2, so that the display element 102C does not turn on—and thus is not addressed— even though a voltage V is being asserted on the address line 108A.

The resistive multiplexing and scanning manner by which the display elements 102 of the display device 100 are individually addressed is consistent with that described in more detail in the issued US patent entitled "Addressing arrays of electrically-controllable elements," which issued on Feb. 1, 2005, as U.S. Pat. No. 6,850,212. By decreasing the number of address lines needed to individually address display elements, this multiplexing manner permits more efficient utilization of what may be scarce space on the display device 100. Furthermore, by implementing multiplexing in a resistive manner, via the multiplexing resistors 312, such a resistive multiplexing manner can be less costly and more efficient, as is the case in the embodiment of the invention that is described next in the detailed description.

Figure 4:
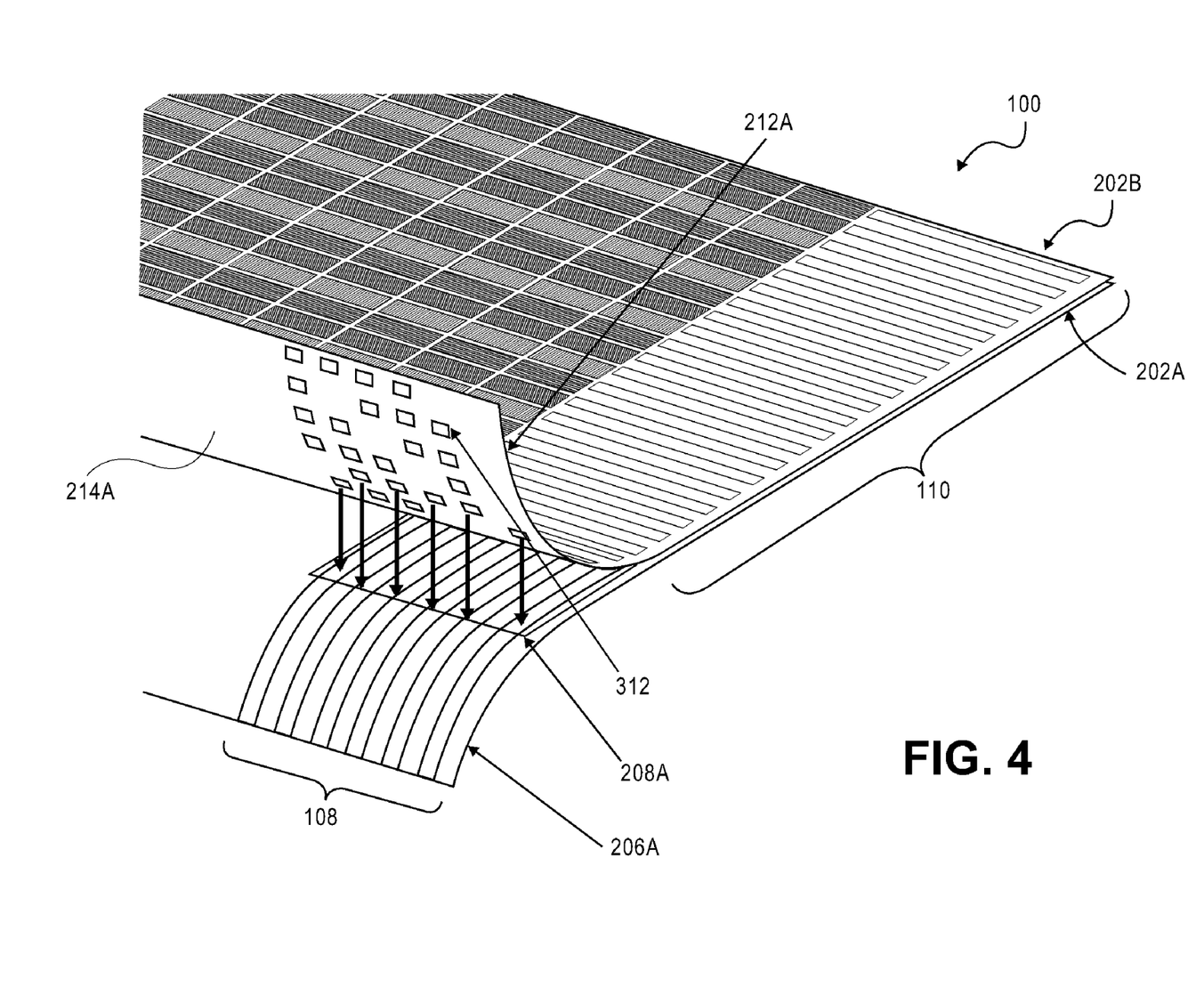
FIG. 4 is a diagram of a display device having multiplexing resistors, according to an embodiment of the invention.

FIG. 4 shows how the multiplexing resistors 312 can be added to the display device 100 to achieve less costly and more efficient resistive multiplexing, according to an embodiment of the invention. A portion of the display device 100 is depicted in which the sides 202 have been flipped as compared to the display element 200 of FIG. 2, such that the side 202B having the data lines 110 is on the top and the side 202A having the address lines 108 is on the bottom. Furthermore, a portion of the side 202A has been "peeled" back in FIG. 4 at the adhesive layer 208A to show where the multiplexing resistors 312 reside or are disposed.

Thus, the substrate layer 206A of the side 202A includes the address lines 108. The resin layer 212A of the side 202A, which includes busbars (not shown in FIG. 4 for illustrative clarity), also includes the multiplexing resistors 312. The multiplexing resistors 312 align with the address lines 108. The multiplexing resistors 312 are configured in relation to the address lines 108 so that a desired multiplexing scheme is provided, such as the multiplexing scheme that has been described in relation to FIG. 3. That is, the multiplexing resistors 312 are positioned in relation to the address lines 108 so that desired multiplexing of the display elements 102 occurs. Finally, the adhesive layer 208A, as has been noted, ensures that the substrate layer 206A adheres to the resin layer 212A.

Disposing or situating the multiplexing resistors 312 within or at the resin layer 212A is advantageous. The resin layer 212A is already present within the display device 100 to include busbars, which communicatively connect the address lines 108 to the display mechanisms of the display elements 102 of the display device 100. Therefore, no additional layer at which the resistors 312 are disposed has to be added to the display device. As such, disposing or situating the resistors 312 within or at the resin layer 212A is less costly to implement, and thus is a more efficient way to achieve resistive multiplexing, than if a separate layer were included just for the disposal of the multiplexing resistors 312. As is described next in the detailed description, the multiplexing resistors 312 can further be formed within or at the resin layer 212A in a manner that provides fault tolerance.

Figure 5A:
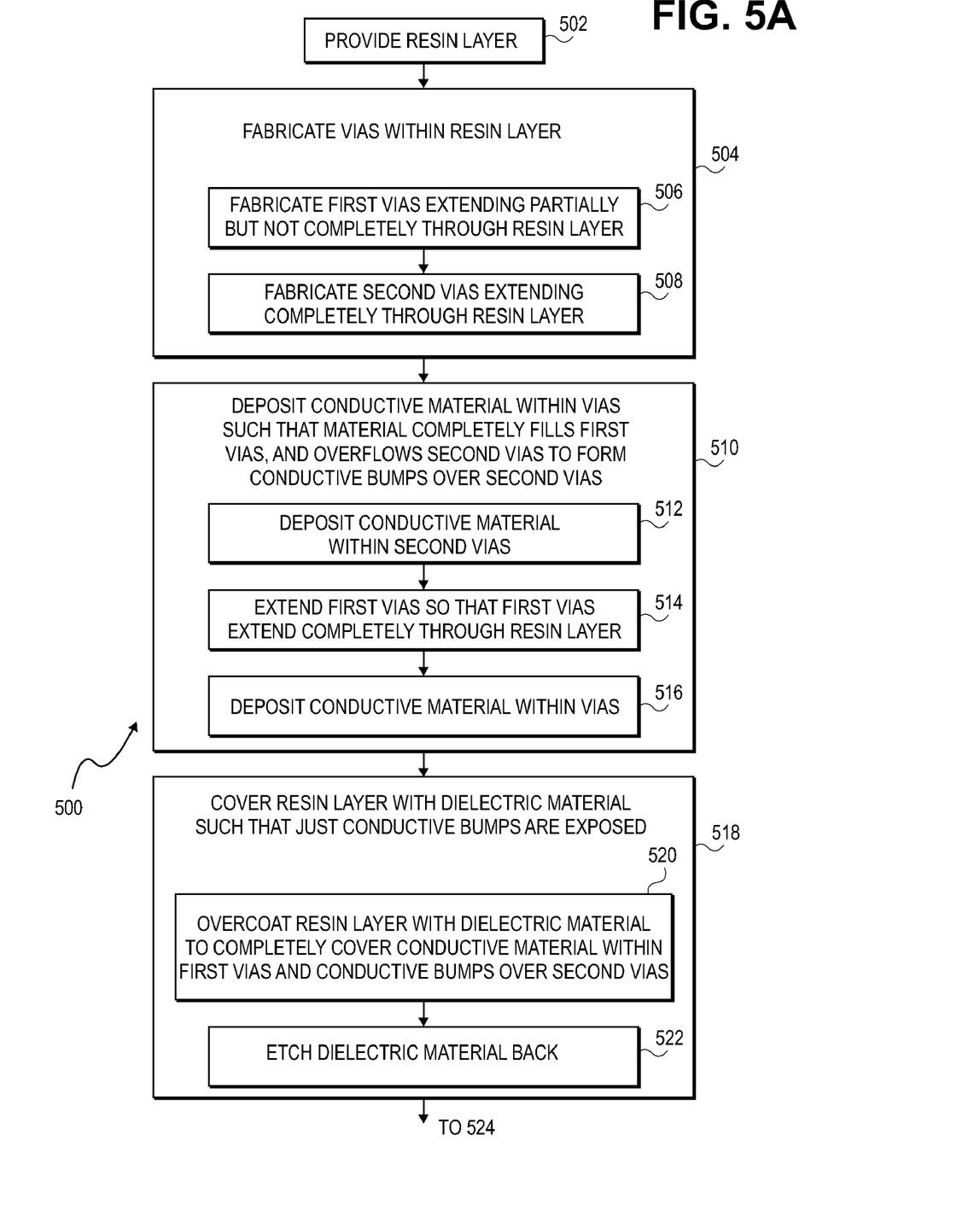
FIGS. 5A and 5B are flowcharts of a method at least for forming one or more multiplexing resistors within a display element of a display device, according to an embodiment of the invention.
Figure 5B:
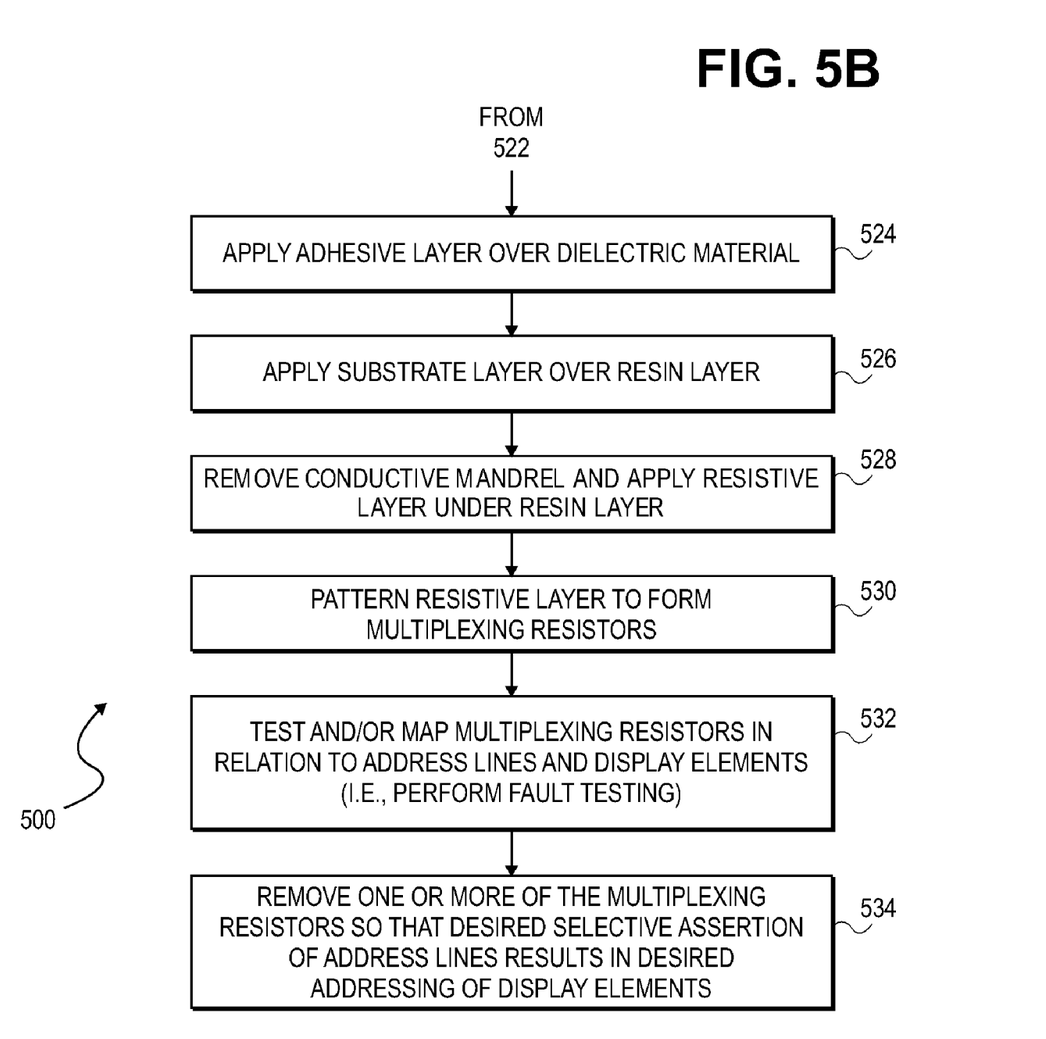

FIGS. 5A and 5B show a method 500 for at least forming the multiplexing resistors 312 within or at the resin layer 212A of the display device 100, according to an embodiment of the invention. Referring first to FIG. 5A, the resin layer 212A is initially provided (502). For instance, a mandrel may be coated with the resin layer 212A. Thereafter, vias are fabricated within the resin layer 212A (504). In one embodiment, what are referred to as first vias that correspond to busbars to be fabricated within the resin layer 212A are formed, and which extend partially but not completely through the resin layer 212A (506). By comparison, what are referred to as second vias that correspond to the multiplexing resistors 312 to be fabricated are formed completely through the resin layer 212A (508).

Figure 6A:
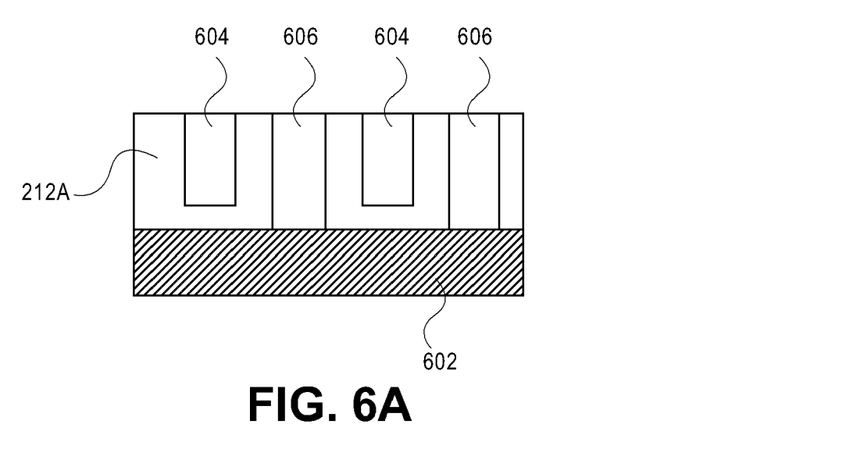
FIGS. 6A, 6B, 6C, 6D, and 6E, are diagrams depicting illustrative performance of the method of FIGS. 5A and 5B, according to an embodiment of the invention.

FIG. 6A shows representative performance of parts 504, 506, and 508 of the method 500, according to an embodiment of the invention. The resin layer 212A is provided on a mandrel 602, which is conductive. First vias 604 and second vias 606 are created within the resin layer 212A. The second vias 606 are extended completely through the resin layer 212A to the mandrel 602 while the first vias 604 are just partially extended through the resin layer 212A. In one embodiment, vias 604 and 606 are embossed with different depths within the resin layer 212A, and then the resin layer 212A is plasma etched so that just the second vias 606 are completely extended to the conductive mandrel 602. In another embodiment, the second vias 606 are extended completed to the mandrel 602 by embossing.

Referring back to FIG. 5A, conductive material is deposited within the vias 604 and 606, such that the conductive material partially or completely fills the first vias 604, but overflows the second vias 606 to form conductive bumps over the second vias 606 (510). For instance, the conductive material may initially be deposited into the second vias 606 (512). Thereafter, the first vias 604 may be extended so that they extend completely through the resin layer 212A to the mandrel 602(514). Finally, the conductive material is deposited again, into both the first vias 604 and the second vias 606 this time (516), so that it fills the first vias 604 and overflows the second vias 606 to form the conductive bumps.

Figure 6B:
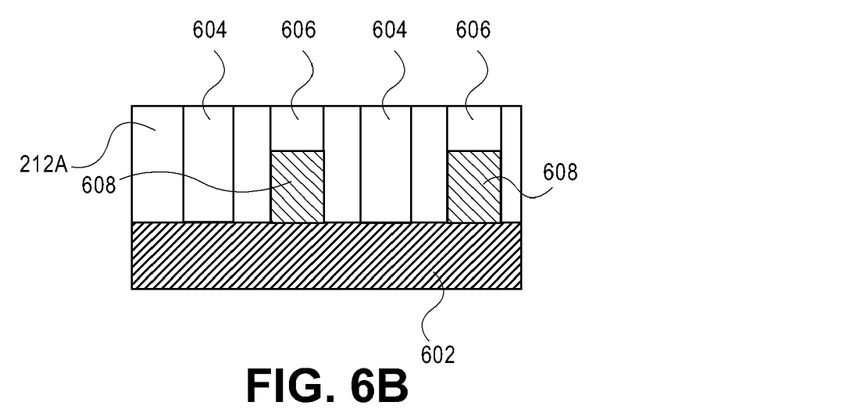
Figure 6C:
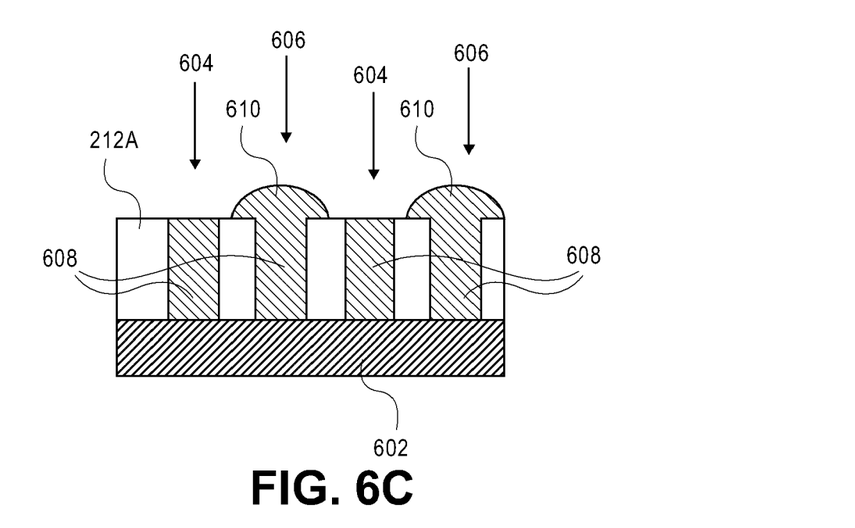

FIG. 6B shows representative performance of parts 512 and 514 of the method 500, and FIG. 6C shows representative performance of part 516 of the method 500, according to an embodiment of the invention. In FIG. 6B, the second vias 606 have been partially filled with deposited conductive material 608. The conductive material 608 may be nickel, another metal or metal alloy, or another type of conductive material.

The deposition process may be achieved by electroplating, insofar as the mandrel 602 is conductive. Electroplating is advantageous in this scenario, since the conductive material 608 substantially does not enter the first vias 604 initially, because the first vias 604 have not yet been extended completely through the resin layer 212A. As such, the conductive material is attracted just to the second vias 606, since the mandrel 602 is exposed at the bottom of just the second vias 606.

Therefore, as is also depicted in FIG. 6B, the first vias 604 are completely extended through the resin layer 2121A to the mandrel 602, by for instance, plasma etching. Next, in FIG. 6C, the conductive material 608 is again deposited, in both the first vias 604 and the second vias 606. For instance where electroplating is employed, the conductive material 608 is attracted to both the first vias 604 and the second vias 606, insofar as the mandrel 602 is exposed at the bottom of both the vias 604 and 606. The conductive material 608 is deposited for a sufficiently long time so that the first vias 604 become substantially full of the conductive material 608. It is noted that the conductive material 608 within the first vias 604 becomes the busbars 618 within the resin layer 212A. However, since the second vias 606 were previously partially filled with the conductive material 608, this length of time results in the conductive material 608 overflowing the second vias 606. As such, conductive bumps 610 form over the second vias 606, from the conductive material 608. A height difference is thus created between the busbars 618 and conductive bumps 610.

Referring back to FIG. 5A, the resin layer 212A is covered with dielectric material so that just the conductive bumps 610 are exposed (518). In one embodiment, the resin layer 212A may first be completely overcoated with the dielectric material, such that the busbars 618 and the conductive bumps 610 are completely covered with the dielectric material (520). Thereafter, the dielectric material is etched back until the conductive bumps 610 are exposed (522).

Figure 6D:
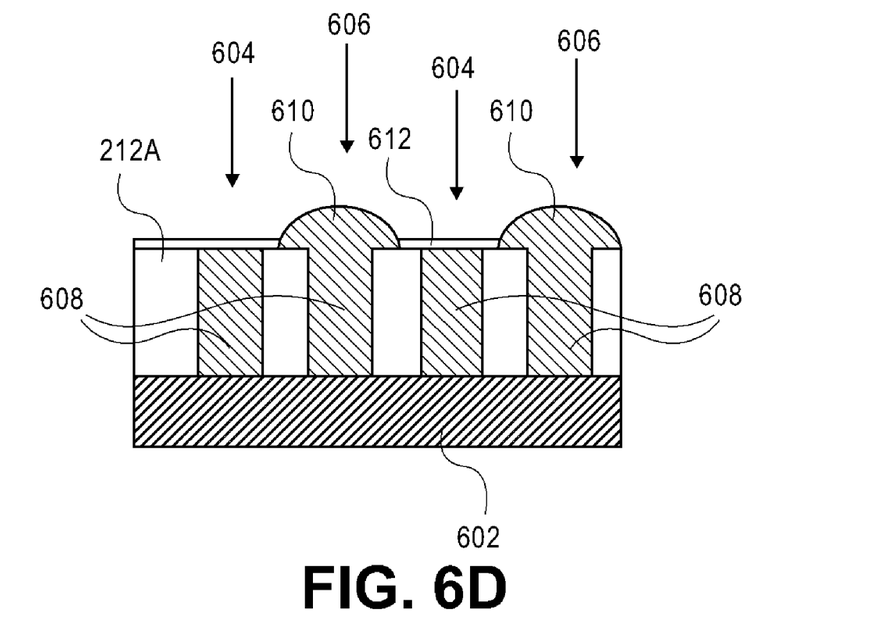

FIG. 6D shows representative performance of parts 518, 520, and 522 of the method 500, according to an embodiment of the invention. Dielectric material 612 has coated the resin layer 212A, including the busbars 618 within the first vias 604, and the conductive bumps 610 over the second vias 606. The dielectric material 612 has then been etched back, such as by using plasma etching, so that just the conductive bumps 610 are exposed through the dielectric material 612, while the busbars 618 are completely covered by the dielectric material 612 due to the height difference between the conductive bumps 610 and the busbars 618. The dielectric material 612 is electrically insulative, and may be fabricated from the material identified under the trade name Norland Optical Adhesive 83H (NOA83H), available from Norland Products, Inc., of Cranbury, N.J., or the dielectric material 612 may be fabricated from another type of dielectric material.

Referring now to FIG. 5B, the adhesive layer 208A is applied over the dielectric material 612 (524). The substrate layer 206A is then applied to the adhesive layer 208A (526). The substrate layer 206A has been preformed before application to the adhesive layer 208A, and as such includes the address lines 108 therein. The mandrel 602 is removed, and after the mandrel 602 is removed, a resistive layer is applied under the resin layer 212A (528). The resistive layer may be fabricated from a complex of polyethylenedioxythiophene (PEDOT) and polystyrene sulfonic acid (PSS), or another type of resistive material.

Figure 6E:
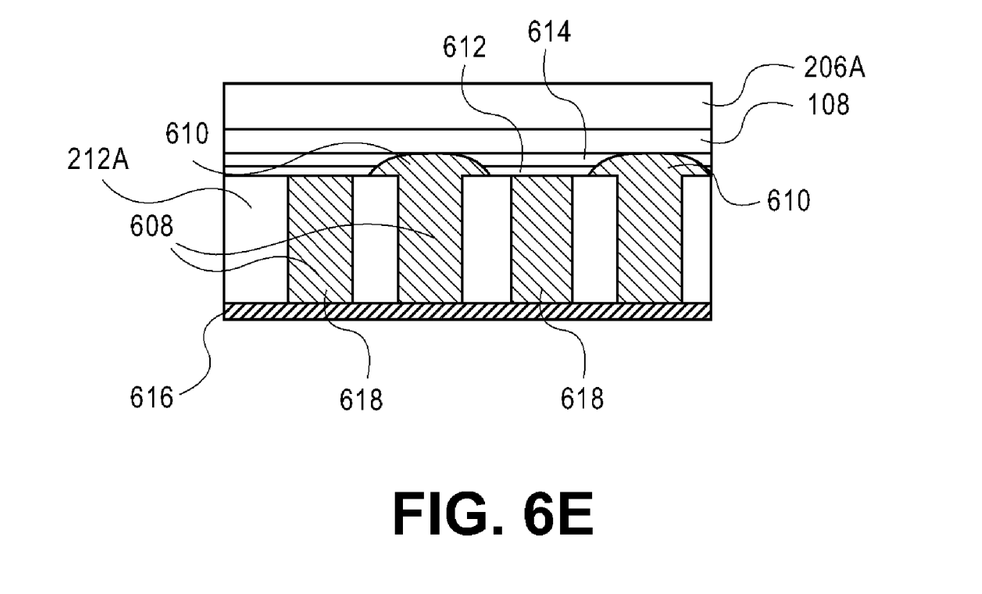

FIG. 6E shows representative performance of parts 524, 526, and 528 of the method 500, according to an embodiment of the invention. The adhesive layer 208A has been applied over the dielectric material 612. The substrate layer 206A, including the address lines 108, has been applied to the adhesive layer 208A. The conductive bumps 610 are thus conductively connected to the address lines 108, either directly, or indirectly via the adhesive layer 208A if the adhesive layer 208A is conductive. After the removal of the conductive mandrel 602 (which is thus not shown in FIG. 6E), a resistive layer 616 is applied under the resin layer 212A. Specifically called out in FIG. 6E are the busbars 618 resulting from the conductive material 608 have been deposited into the first vias 604.

Referring back to FIG. 5B, the resistive layer 616 is patterned to form resistors of desired resistance values between the conductive bumps 610 and busbars 618 (530). Patterning may be achieved by laser ablation, or another process suitable for the resistive material 616. In one embodiment of the invention, the position of the second vias 606 corresponds to the multiplexing resistors 312 in FIG. 3. For instance, two second vias 606 are placed alongside the busbar, or the row that connects to the display element 102A and 102B. The two conductive bumps formed over these two vias are conductively connected to address lines 108A and 108B, respectively, as has been described. After the patterning of part 530 has been performed, two multiplexing resistors 312 of desired resistance value are formed between the row that connects to the display element 102A and 102B and the address lines 108A and 108B, whereas this row is not conductively connected to the address lines 108C and 108D.

In another embodiment of the invention, the positions of the second vias 606 are such that after the resistor patterning performed in part 530, multiplexing resistors 312 are formed between each address line and each row of display elements 102. That is, in relation to FIG. 3, this means that for the four address lines 108 shown, each row of display elements 102 has a multiplexing resistor 312 to each of these four address lines 108. Stated another way, as opposed to the above embodiment in which a distinct configuration of the multiplexing resistors 312 is formed, after performance of just part 530 of the method 500, the resistors 312 would form a grid.

Thereafter, the multiplexing resistors 312 and other parts, portions, and components of the display device 100 can be tested for proper performance, so that a mapping of the multiplexing resistors 312 in relation to the address lines 108 and the display elements 102 can be ascertained for desired multiplexing of the elements 102 using the resistors 312 (532). That is, first fault testing is performed to determine which, if any, of the multiplexing resistors 312 and the address lines 108, for instance, have not been properly fabricated. Once such faults have been determined, the multiplexing resistors 312 can be mapped to the address lines 108 to achieve the desired resistive multiplexing configuration while avoiding any faulty resistors 312 and address lines 108.

For example, consider the display device 100 of FIG. 3. As has been noted, after performing part 530, each row of display elements 102 has a multiplexing resistor 312 connecting it to each of the address lines 108. As depicted in FIG. 3, the row of display elements 102 including the display element 102A is connected via multiplexing resistors 312 to both the address lines 108A and 108B. However, the address line 108A may have been improperly formed, such that it is not conductively connected to this row of display elements 102, and the multiplexing resistor 312 connecting this row of display elements 102 to the address line 108B also may have been improperly formed. It is presumed for this example, though, that the remainder of the connections of the address lines 108 to the other rows of display elements 102, and the other multiplexing resistors 312, have been properly formed.

Therefore, instead of mapping the address lines 108A and 108B to the row of display elements 102 in FIG. 3 that includes the display element 102A via multiplexing resistors 312, the address lines 108C and 108D are mapped to this row of display elements 102. The connection of the address lines 108 to the other two rows of display elements 102 are likewise modified to conform with this new configuration of the multiplexing resistors 312. Thus, by initially forming the multiplexing resistors 312 for all address line-to-display element row connections in part 530, if any of the resistors 312 and/or any of the address lines 108 prove faulty, such faults can be mapped around in the ultimate multiplexing resistor configuration. As such, the method 500 provides for a degree of fault tolerance in the resistive multiplexing and scanning manner by which the display elements 102 of the display device 100 are individually addressed.

Finally, then, any of the multiplexing resistors 312 that have been formed in part 530, but that are not part of the ultimate mapping that has been achieved in 532, are removed (534). This is achieved so that the desired configuration of address lines 108 to display elements 102 via multiplexing resistors 312 determined in part 532 is implemented. The unneeded and/or faulty multiplexing resistors 312 can be removed by laser ablation, or in another manner. The end result is a configuration of the multiplexing resistors 312 that is no longer a simple grid of such resistors 312, as depicted in FIG. 4, for instance.

At least some embodiments of the resistive multiplexing approach that has been described thus provide for advantages over the prior art. Resistive multiplexing reduces the number of address lines 108 to individually address the display elements 102 of the display device 100. Implementing the multiplexing resistors 312 within or at the resin layer 212A leverages a layer that may already be included within the display device 100, for busbar 618 purposes. Finally, forming the multiplexing resistors 312 as has been described enables a degree of fault tolerance should any of the resistors 312 and/or any of the address lines 108 prove to have not been formed properly.

It is noted that the method of FIGS. 5A and 5B has been described in relation to multiplexing resistors of a display element. However, the method can be employed to form other types of electrical devices, other than multiplexing resistors. Such other types of electrical devices can include, for instance, multiple-level electronic circuitry that may or may not be used in relation to a display element of a display device. Such multiple-level electronic circuitry can include an interconnect pattern, an example of which has been described as the multiplexing resistors 312 herein.

We claim:

1. A display element for a display device, comprising:
a display mechanism; and,
a resin layer in which one or more busbars are disposed and in which one or more multiplexing resistors are disposed,
wherein the multiplexing resistors are communicatively connected to one or more address lines to permit the display mechanism to be addressed by selective assertion of the address lines in a multiplexing manner,
and wherein a height of each busbar is equal to a height of the resin layer, such that a bottom surface of each busbar is collinear with a bottom surface of the resin layer, and a top surface of each busbar is collinear with a top surface of the resin layer.

2. The display element of claim 1, wherein the multiplexing resistors define a turn-on voltage of the display mechanism.

3. The display element of claim 1, wherein the address lines are communicatively connected to the display mechanism via the busbars.

4. The display element of claim 1, further comprising a substrate layer within or at which the address lines are disposed.

5. The display element of claim 4, further comprising an adhesive layer to adhere the resin layer to the substrate layer.

6. The display element of claim 1, further comprising a plurality of color filters over the display mechanism.

7. The display element of claim 1, wherein the display mechanism has a plurality of gradations, the gradations permitting the display mechanism to display a plurality of brightness levels of one or more colors.

8. The display element of claim 1, wherein the display mechanism is a liquid crystal display (LCD) mechanism.

9. A display device comprising:
a plurality of display elements;
a substrate layer having a plurality of address lines, the display elements selectable by the address lines;
a resin layer underlying the display elements;
a plurality of multiplexing resistors disposed within the resin layer, each multiplexing resistor communicatively connecting one of the display elements to one of the address lines; and,
one or more busbars disposed within the resin layer,
wherein the display elements are individually selectable in a multiplexing manner by selective assertion of the address lines,
wherein a height of each busbar is equal to a height of the resin layer, such that a bottom surface of each busbar is collinear with a bottom surface of the resin layer, and a top surface of each busbar is collinear with a top surface of the resin layer.

10. The display device of claim 9, wherein the substrate layer having the plurality of address lines is a first substrate layer, the display device further comprising a second substrate layer having a plurality of data lines such that the display elements are individually selectable in the multiplexing manner and in a scanning manner by selective assertion of the address lines as the data lines are scanned.

11. The display device of claim 9, wherein each display element comprises a portion of the resin layer.

12. The display device of claim 11, wherein each display element comprises one of the busbars disposed within the portion of the resin layer of the display element, to connect the address lines to the display mechanism via the busbars.

13. The display element of claim 9, wherein each display mechanism is a liquid crystal display (LCD) mechanism having a plurality of gradations, the gradations permitting the display mechanism to display a plurality of brightness levels of one or more colors.

14. The display element of claim 9, further comprising an adhesive layer to adhere the resin layer to the substrate layer.

15. A method comprising:
providing a resin layer;
fabricating a plurality of vias within the resin layer, including one or more first vias corresponding and one or more second vias;
depositing conductive material within the plurality of vias such that the conductive material overflows the second vias to form conductive bumps over the second vias, the conductive material between a bottom surface of each via and a top surface of each via being a busbar, such that the busbar is disposed within the resin layer;

covering the resin layer with a dielectric material so that just the conductive bumps over the second vias are exposed; and, applying a substrate layer over the resin layer, conductors on the substrate layer conductively connected to the conductive material within the polarity of vias to form a desired interconnect pattern, wherein a height of the busbar is equal to a height of the resin layer, such that a bottom surface of the busbar is collinear with a bottom surface of the resin layer, and a top surface of the busbar is collinear with a top surface of the resin layer.

16. The method of claim 15, further comprising applying a conductive/resistive layer under the resin layer, the resistive layer conductively connected to the conductive material within the plurality of vias; and, patterning the conductive/resistive layer to form a desired electrical device.

17. The method of claim 15, wherein fabricating the plurality of vias within the resin layer comprises:

fabricating the first vias such that the first vias extend partially but not completely through the resin layer; and, fabricating the second vias such that the second vias extend completely through the resin layer.

18. The method of claim 17, wherein depositing the conductive material within the plurality of vias comprises:

depositing conductive material within the second vias, the conductive material partially filling the second vias;

extending the first vias so that the first vias extend completely through the resin layer; and, depositing the conductive material within the first and the second vias, the conductive material substantially filling the first vias and overflowing the second vias to form the conductive bump over each second via.

19. The method of claim 15, wherein covering the resin layer with the dielectric material so that just the conductive bumps over the second vias are exposed comprises:

overcoating the resin layer with the dielectric material such that the conductive material within the first vias and the conductive bumps over the second vias are covered; and, etching the dielectric material back so that just the conductive bumps over the second vias become exposed.

20. The method of claim 15, further comprising applying an adhesive layer over the dielectric material prior to applying the substrate layer over the resin layer, such that the adhesive layer adheres the substrate layer to the resin layer upon application of the substrate layer over the resin layer.

* * * * *